United States Patent [19]
Buell

[11] 3,729,577
[45] Apr. 24, 1973

[54] CLAMP CIRCUIT FOR A COLOR TELEVISION RECEIVER

[75] Inventor: Donald F. Buell, Baldwinsville, N.Y.

[73] Assignee: General Electric Company, Portsmouth, Va.

[22] Filed: Jan. 19, 1971

[21] Appl. No.: 107,685

[52] U.S. Cl. .......... 178/5.4 R, 178/7.5 DC
[51] Int. Cl. .......... H04n 9/12, H04n 5/18
[58] Field of Search .......... 178/5.4 R, 7.3 DC, 178/7.5 DC; 315/30; 330/11

[56] References Cited

FOREIGN PATENTS OR APPLICATIONS 923,173 4/1963 Great Britain .......... 178/7.3 DC

*Primary Examiner*—Robert L. Griffin
*Assistant Examiner*—George G. Stellar
*Attorney*—Frank L. Neuhauser, Oscar B. Waddell, Joseph B. Forman, W. J. Shanley, Stanley C. Corwin and F. W. Powers

[57] ABSTRACT

A clamping circuit which provides a first biasing voltage to a color signal transmission path when a video signal is received, and a second, lower biasing voltage when no signal is received. A transistor is periodically gated into conduction by a horizontal synchronizing pulse, charging a capacitor placed in shunt with one portion of a resistive voltage divider. The capacitor discharges through the voltage divider portion, increasing the voltage drop thereacross. The increased voltage drop causes the potential of other portions of the voltage divider to rise proportionately, increasing the biasing voltage applied to the color signal transmission path. When no video signal is received the horizontal synchronizing pulses cease and the transistor is disabled, causing the bias voltage provided by the voltage divider to fall to its quiescent level.

6 Claims, 1 Drawing Figure

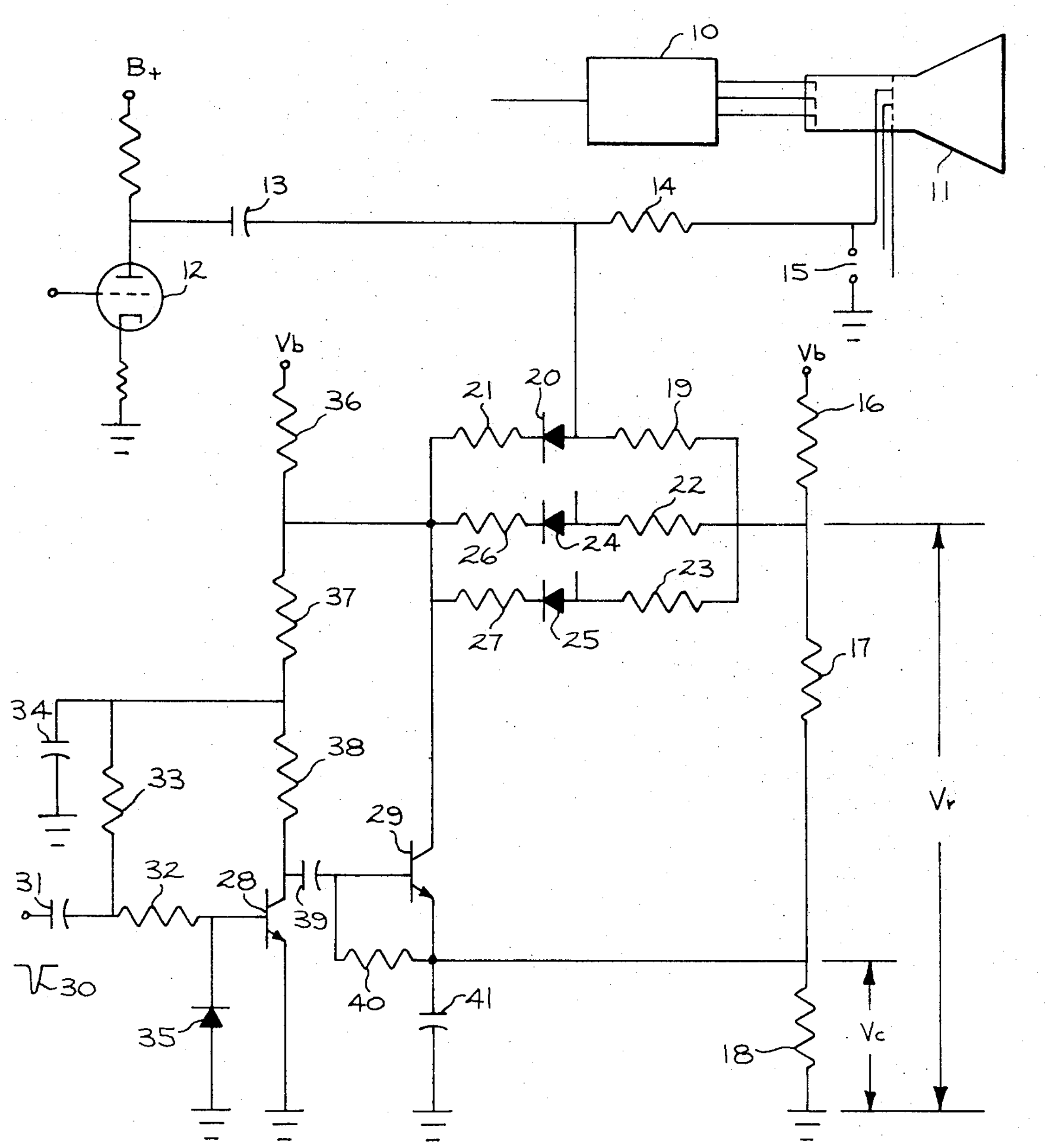
INVENTOR
DONALD F. BUELL
BY James E Espe
HIS ATTORNEY

CLAMP CIRCUIT FOR A COLOR TELEVISION RECEIVER

BACKGROUND OF THE INVENTION

The present invention relates to color television receivers and, more particularly, to circuitry for maintaining cathode ray tube control electrode voltages at suitable values. In a typical color television, color difference signals are applied to each of three control grids in a cathode ray tube, each control grid serving to modulate the stream of electrons produced by a corresponding electron gun. While color difference information consists in variations in the voltages applied to these grids, it will be recognized that the brilliance of the display produced by the stream of electrons from the various electron guns is a function of the voltage differential between the cathode of each gun and its corresponding grid. Thus, while the variations in grid voltage modulate the display, the DC component of grid voltage serves to determine the brightness level or "gray scale" of the displayed image.

After color difference signals have been derived from a received video signal they are ordinarily amplified by suitable means, such as transistors or vacuum tubes, and applied to the proper control grid of a cathode ray tube. To avoid unwanted interaction between each amplifier and its associated grid, or in order to place the grids at suitable DC voltage levels, blocking capacitors are sometimes inserted in series with the color signal path. The blocking capacitors serve to provide DC isolation to each amplifier from the grid, and thus from the signal transmission path. In such an instance means must be provided to establish a suitable DC voltage level on the color signal transmission path in order to provide a proper gray scale, and to maintain the desired voltage differential between the cathodes and control grids of the cathode ray tube. One approach to this problem is to periodically couple the transmission path to a point of predetermined voltage such that the voltage level of the transmission path is "-clamped" at the desired value. Usually, gating means are provided to periodically connect the transmission path to the point of clamping potential. Such gating means may be activated by periodically-applied pulses, such pulses advantageously being in synchronism with the horizontal synchronizing pulses transmitted as part of the composite video signal. In other cases, clamping occurs in response to locally-generated pulses, which pulses continue to be produced even when the composite video signal is not being received.

In the last-mentioned case during a time when no video signal is received, such as will occur as the tuner of a receiver is moved from one channel position to another, the locally-generated signal serves to continue the clamping process. The voltage of the color signal transmission path continues to be periodically reestablished, avoiding a cumulative voltage buildup on the path caused by the biasing circuitry.

However, in other types of receivers wherein clamping occurs only in response to pulses derived from the composite video signal, the biasing circuitry will continue to buildup transmission path voltage unmitigated by clamping activity during periods in which the receiver tuner is orientated between channels, or for some other reason no video signal is being received. The results of such an increase in voltage of the color signal transmission path can be startling, resulting in the sudden appearance of a brilliant raster upon the face of the cathode ray tube. While the production of such a raster is ordinarily not harmful to the cathode ray tube or to other parts of the receiver, it can be disconcerting to the layman. An uninformed viewer may take the phenomenon to be indicative of a malfunction; at the very least, the production of such a sudden flash tends to detract from the enjoyable operation of the receiver.

It would therefore be desirable to provide in a color television receiver which is dependent upon a received signal for the production of clamping pulses, means for preventing a biasing source from raising grid bias above its normal operating value when a composite video signal is not being received.

It is therefore an object of the present invention to provide a clamping circuit which provides a first, higher voltage for biasing a color signal transmission path when a video signal is being received, and a second, lower voltage for biasing the path when no video signal is being received.

It is another object of the present invention to provide a clamping circuit operated in response to received signals, which does not allow the voltage of the color signal transmission path to vary substantially from its normal operating value in the absence of such signals.

SUMMARY OF THE INVENTION

Briefly stated, in accordance with one aspect of the present invention, means are provided for deriving a first biasing voltage and applying the biasing voltage to a color signal transmission path by means of a bleeder resistor. The voltage level thus derived is substantially that desired to be present upon the transmission path when a picture is being produced by the receiver. A second, booster voltage is generated upon the reception of clamping signals and is applied across resistive means coupled between the point of first biasing voltage and ground. The additional voltage drop across the resistive means causes the biasing voltage to rise by an increment substantially equal to the second, booster voltage.

In order to carry out another aspect of the invention the series combination of a diode, resistive means and gated switch means are connected between the color signal transmission path and a source of reference voltage. Upon the reception of periodic clamping signals the gated switch means is operable to cause the transmission path to be clamped to the value of the reference voltage. When the clamping signals cease, the first, biasing voltage maintains the transmission path at a proper operating voltage. When clamping pulses are present, however, the booster voltage source is activated to increase the value of the bias voltage. The gated switch means is simultaneously operated to clamp the transmission path to a source of reference potential, periodically re-establishing the voltage level of the transmission path at the desired level.

BRIEF DESCRIPTION OF THE DRAWING

While the specification concludes with claims particularly pointing out and distinctly claiming the subject matter which is regarded as the invention, it is believed that the invention will be better understood from the following description of the preferred embodiment, taken in connection with the accompanying drawing, in which the single FIGURE is a schematic circuit showing selected portions of a color television receiver, including the novel clamping circuit.

DESCRIPTION OF THE PREFERRED EMBODIMENT

Referring now to the FIGURE certain portions of a color television receiver are illustrated, including a luminance amplifier 10 which serves to apply suitable voltages to appropriate electrodes, such as the cathodes of the electron guns of a conventional cathode ray tube 11. Color signals produced by suitable amplifier are applied to each of the control grids of the cathode ray tube. For purposes of illustration only one such amplifier is illustrated, here depicted as vacuum tube 12 although it will be recognized that similar amplifiers may be used to supply signals to the remaining control grids. Signals outputted by tube 12 are coupled through a blocking capacitor 13 and a current limiting resistor 14 to other appropriate electrodes, such as one of the control grids of the cathode ray tube. A pair of electrodes 15 comprise a spark gap designed to arc under conditions of extreme over voltage, for preventing damage to the cathode ray tube.

The DC voltage level of the color signal transmission path is established by means of voltages derived from a source of DC potential, $V_b$, herein designated as +400 volts. A voltage divider comprising series-connected resistors 16, 17 and 18 provides a suitable bias voltage, the voltage $V_r$ at the intersection of resistor 16 and 17 being communicated to the transmission path by means of means of a bleeder resistor 19 and serving to bias the path to a proper voltage. Diode 20 and associated resistor 21 comprise the first portion of a circuit utilized for periodically re-establishing the voltage of the illustrated transmission path.

All will be recognized by those skilled in the art, amplifiers similar to tube 12 are provided for each of the remaining two color signal transmission paths of the cathode ray tube. Similarly, bleeder resistors 22 and 23 are provided for biasing these transmission paths, and diodes 24 and 25 and associated resistors 26 and 27 provide unidirectional current paths for clamping the other transmission paths to the desired voltage level. In order to simplify the illustration, the remaining amplifiers and transmission paths associated therewith are not shown, it being understood that the operation of the circuit to be described is the same as the operation of the circuits associated with the other transmission paths.

First and second transistors 28 and 29 serve as a switch means for energizing selected portions of the circuit in response to the presence of gating signals. Such a gating signal 39 may be coupled through a capacitor 31 and a resistor 32 to the base terminal of transistor 28. Resistor 33 and capacitor 34 serve to establish the proper forward bias upon the base terminal of transistor 28 while diode 35 limits the negative excursions of the emitter-to-base voltage. A second voltage divider including resistors 36, 37 and 38 supplies predetermined DC voltages to the collector terminals of transistors 28 and 29 and by way of resistor 33 to the base terminal of transistor 28. Capacitor 39 couples pulses resulting from the operation of transistor 28 to the base of transistor 29, while resistor 40 serves to properly bias the base-to emitter junction of transistor 29. Storage capacitor 41 is connected between the emitter of transistor 29 and ground, and thus lies in parallel with resistor 18 of the first-mentioned voltage divider.

The operation of the inventive system will now be described, with reference to the numerals of the FIGURE as set forth above. It will initially be assumed that the receiver is operative, and that gating pulses 30 are being received by the system. Such pulses are ordinarily produced in synchronism with the horizontal synchronizing pulse transitted as a part of the composite video signal, such that the clamping action of the circuit occurs during retrace time and does not affect the displayed image. When a negative-going pulse such as that illustrated at 30 is applied to coupling capacitor 31, transistor 28 ceases to conduct with the result that the voltage of the collector terminal thereof rises rapidly. This rise is reflected in a pulse transmitted through coupling capacitor 39 to the base of transistor 29, biasing the transistor 29 into conduction. When transistor 29 enters the conductive mode, it serves as a conductive path from the lower end of resistor 36 to storage capacitor 41 and resistor 18. Transistor 29 further serves to conductively couple the color signal transmission path to the upper ends of capacitor 41 and resistor 18 by way of diode 20 and resistor 21. By judicious selection of values for resistor 18 and capacitor 41 a relatively long time constant is afforded, such that the charge accrued by capacitor 41 during periods of conduction of transistor 29 is not substantially dissipated during the intervening periods of nonconduction. The voltage $V_c$ to which capacitor 41 is charged is primarily a function of the values of resistors 16, 17, 18 and 36, 37, and of the peroid of time for which transistor 29 conducts. Capacitor 41 is caused to charge to a voltage substantially larger than the voltage drop which is produced across resistor 18 by voltage $V_b$ alone. The voltage increment appearing across resistor 18 due to the charging of capacitor 41 determines the additional signal path bias, as will be explained hereinafter. The voltage to which capacitor 41 is charged is approximately that to which the signal transmission path is to be clamped, and is in practice several volts lower than the desired operating potential of the path voltage. Therefore, as transistor 29 becomes conductive, diode 20 is forward biased by the amount by which the voltage of the transmission path exceeds that of capacitor 41. Capacitor 13 is partly discharged during the clamping pulse. As the clamping pulse terminates, transistor 28 re-enters the conductive mode, and transistor 29 is de-energized. With the de-energization of transistor 29 the voltage at the collector terminal thereof rises to a value greater than the operating potential of the signal transmission path, back biasing diodes 20, 24 and 25. The operating potential of the signal transmission path is now re-established and a trace period begins.

In order to enhance the clamping operation and to insure that diodes 20, 24 and 25 conduct readily upon the energization of transistor 29, biasing voltage $V_r$, now increased due to the discharging of storage capacitor 41 across resistor 18, is applied by means of bleeder resistors 19, 22 and 23 to the transmission paths. The magnitude of the bleeder resistors, however, is such as to allow only a very small current to flow, with the result that the increase in voltage of the transmission path during any single trace time results only in imperceptible changes in the brightness of the displayed image.

Without the periodic conduction of transistor 29 and the resulting charging of storage capacitor 41 the voltage supplied by the first voltage divider constituted by resistors 16, 17 and 18 would be of a first, lower order of magnitude, the voltage $V_r$ at the intersection of resistors 16 and 17 being substantially that of the signal transmission path during a trace. However, due to the periodic conduction of transistor 29 and the resultant charging of capacitor 41, current from storage capacitor 41 flowing through resistor 18 causes an increased voltage drop thereacross. As a result, voltage $V_r$ increases by a corresponding increment. In the circuit illustrated, for example, judicious selection of the circuit components may provide a voltage drop $V_c$ across resistor 18 of substantially 167 volts, and a corresponding drop $V_r$ across resistors 17 and 18 of 200 volts, when no gating pulses are incident upon the circuit. It will be assumed that the 200 volt value of $V_r$ matches the voltage upon the color signal transmission path during trace time. However, due to the periodic conduction of transistor 29 and the relatively high-impedance discharge-path presented to storage capacitor 41 by resistor 18, capacitor 41 charges to a voltage of substantially 195 volts with a negligible ripple factor. The increased voltage drop across resistor 18 effects a related voltage rise of approximately 25 volts at the intersection of resistors 16 and 17 such that a 225 volt bias is now presented to the signal path by means of bleeder resistor 19. The total voltage differential across resistors 19, 22 and 23 is thus approximately 25 volts under conditions in which clamping pulses 30 are applied to the circuit, the voltage differential becoming virtually negligible when the clamping pulses cease.

As stated above, the clamping activity for the two remaining color signal transmission paths is identical to that described above, with a common clamping voltage being applied to the cathodes of diodes 24 and 25 by means of resistor 26 and 27. Similarly, upon cessation of the gating pulses the voltage $V_r$ applied to the other color signal transmission path by means of bleeder resistors 22 and 23 drops to substantially the same voltage as is present on the transmission path during trace time.

While it will be recognized that the values of the various circuit elements depend upon many factors and may be varied to achieve optimum results in a given situation, one circuit which was found to be satisfactory utilized elements having the following values:

| | |
|---|---|
| Resistors **14** | 3.3K ohms |
| **16** | 180K ohms |
| **17** | 30K ohms |
| **18** | 150K ohms |
| **19** | 2.2M ohms |
| **21** | 3.3K ohms |
| **22** | 2.2M ohms |
| **23** | 2.2M ohms |
| **26** | 3.3K ohms |
| **27** | 3.3K ohms |
| **32** | 56K ohms |
| **33** | 100K ohms |
| **36** | 39K ohms |
| **37** | 164K ohms |
| **38** | 10K ohms |
| **40** | 10K ohms |
| Capacitors **13** | 0.01 microfarads |
| **31** | 20 picofarads |
| **34** | 820 picofarads |
| **39** | 1500 picofarads |
| **41** | 0.01 microfarads |
| Transistors **28** | type 16 E (GE) |
| **29** | SE7055 (Fairchild) |
| Diodes **20,24,25** | R400R (SCI) |
| **35** | 1N4446 |

It will thus be seen that the present invention provides means for periodically applying a predetermined clamping voltage to a color signal transmission path, and at the same time causing the level of a biasing voltage to rise to a suitable value. In the absence of gating pulses, the clamping activity ceases and as a consequence thereof the level of the biasing voltage declines to a value which is substantially the same as that of the signal path. Without this decline, in the absence of clamping pulses the signal transmission path would rise to a voltage level equal to that of the biasing voltage, resulting in the production of a brilliant raster upon the screen of the cathode ray tube. However, when the biasing voltage is of a magnitude substantially the same as the voltage of the signal transmission path during trace time, the raster displayed upon the screen of the cathode ray tube will remain subduced despite the cessation of clamping pulses.

As will be evident from the foregoing description, certain aspects of the invention are not limited to the particular details of the example illustrated, and it is therefore contemplated that other modifications or applications will occur to those skilled in the art. It is therefore intended that the appended claims shall cover such modifications and applications as do not depart from the true spirit and scope of the invention.

What is claimed as new and desired to be secured by Letters Patent of the United States is:

1. In a color television receiver including a cathode ray tube having at least one control electrode, means for deriving periodic synchronizing pulses from a received signal, means for providing color signals and means for transmitting the color signals from the color signal providing means to the control electrode, means for establishing a first bias on the control electrode in the presence of the synchronizing pulses, and a second bias in the absence of the synchronizing pulses comprising:

means for developing the first bias comprising a voltage divider including first, second and third resistive means, said voltage divider being coupled between a point of bias potential and a point of reference potential and developing said first bias at the intersection of said second and third resistive means;

means for coupling the first bias to a control electrode of the cathode ray tube;

means for developing a second bias;

switch means operative to assume a first state in the presence of synchronizing pulses and a second state in the absence of synchronizing pulses for applying said second bias to said first resistive means in response to the reception of the periodic synchronizing pulses, said switch means being connected between the intersection of said first and said second resistive means and a point at the second bias and having a control terminal coupled to the means for deriving periodic pulses; and clamping means energizable in the presence of the periodic synchronizing pulses for periodically establishing a voltage upon said control electrode which is of substantially the same magnitude as the voltage provided in the absence of the periodic synchronizing pulses by said means for developing said first bias.

2. In a color television receiver including a plurality of transmission paths for transmitting color signals to predetermined ones of the electrodes of a cathode ray tube, clamping circuit means for applying a first, higher reference voltage to the transmission paths when a video signal is being received and a second, lower voltage to the transmission paths when no video signal is being received, comprising:

resistive means coupled between a point of first bias potential and a point of reference potential;

diode means having a first and a second side;

means coupling a point intermediate the ends of said resistive means to the first side of said diode means and to one of said transmission paths;

capacitor means connected between a point intermediate the ends of said resistive means and a point of reference potential;

means coupling the second side of said diode means to a point of second bias potential;

switch means operable to couple the junction of said capacitor means and said resistive means to the point of second bias potential; and means for applying synchronizing pulses from a received video signal to said switch means.

3. The invention as defined in claim 2, wherein said resistive means comprises a voltage divider.

4. The invention as defined in claim 3, further including:

second resistive means coupling said second side of said diode means to said switch means and said point of said second biasing potential.

5. The invention as defined in claim 4, wherein said synchronizing pulse is derived from the horizontal sync pulse of a composite video signal.

6. The invention as defined in claim 5, wherein said switch means comprises at least one transistor.

* * * * *